Oct. 21, 1941.　　　E. R. BURTNETT　　　2,259,731
TRANSMISSION MECHANISM
Filed April 21, 1938　　　2 Sheets-Sheet 2

INVENTOR.
Everett R. Burtnett

Patented Oct. 21, 1941

2,259,731

UNITED STATES PATENT OFFICE 2,259,731

TRANSMISSION MECHANISM

Everett R. Burtnett, Los Angeles, Calif., assignor of one-half to Edith Glynn Burtnett, Los Angeles, Calif.

Application April 21, 1938, Serial No. 203,320

50 Claims. (Cl. 74—260)

The present invention relates to automatic variable speed mechanisms for transmitting power from a driving member to a driven member and to means giving the operator a degree of control over the automatic range and to alternatively employable means for selectively establishing fixed forward and reverse gear drive connections between the driving and driven members which will neutralize the automatic range of variable speed transmitting mechanism, forming a combination adapted for a wide variety of automotive and industrial drives but more particularly for use in motor vehicles.

It has long been recognized that four forward speeds were required in passenger automobiles if the steps between the change speed ratios were not to be too great and if the internal combustion prime mover was to be facilitated to operate most advantageously throughout the driving range. In this connection, it has come to be understood that a preferred gear for starting the vehicle would be the lowest ratio of four forward speeds; and that transition out of this gear and into a second ratio of four forward speeds would occur before the engine had reached a speed (accelerating the vehicle) at which the acceleration curve had started to flatten out; and in connection with automatic change speed control preferably that this first change speed transition could take place without easing off on the throttle if the rate of vehicle acceleration was to be maintained at maximum until an appreciable vehicle speed and momentum value was reached. It has further been considered preferable that the second speed ratio of four forward speeds prevail for continued vehicle acceleration until a speed had been reached at which a more constant driving speed was in order, and then for the fourth speed to come into play, skipping the third speed ratio because of its lower acceleration value as an alternative to the second speed ratio. The third speed of a four forward speed range has come to be considered a preferred alternative-to-high (fourth) speed ratio to be dropped downward into quickly, and without incurring momentary deceleration of the driving member, if that were possible, for moments where a flash of what might be termed a low-high speed ratio was needed for fleeting performance, like in passing another vehicle on a grade. Third speed is appreciated in the minds of transmission designers as a preferred alternative to high (fourth) speed because of its comparatively slight step downward which, in the event of being brought into play at comparatively high vehicle speeds, would not promote an excessive step-up in engine speed, already quite high.

Since the second speed ratio could be employed to accelerate the vehicle to a speed at which its momentum would be sufficient to maintain (without an appreciable flattening out) while the transition to fourth speed was taking place, it has been considered preferable that the automatic control for transition out of second speed upward be superimposed by the operator momentarily decelerating the driving member. By this means the second speed could be continued until the attainment of various vehicle acceleration speeds according to the driver's will. And finally, it has come to be realized that a high safety factor and unprecedented motor vehicle performance would accompany means for causing the transmission to revert from the established fourth speed to third speed, at the will of the operator, without requiring cessation of the power flow in order to accomplish this transition downward to the higher rate accelerating gear. For, in the short period of the usual few seconds a driver has to take advantage of a momentary clearance for a flash of acceleration beyond an obstacle, a momentary deceleration of the driving member to accomplish the reversion downward to a higher rate accelerating gear would consume a good part of the opportune moment for vehicle acceleration.

In accordance with the above outlined preferred points in an automatic transmission development, the present invention has for a principal object the provision of an all mechanical four forward speed automatic transmission embodying the first, second and fourth speeds in an acceleration range from a standing start; and embodying the third speed of the automatic range solely obtainable at the option of the driver as an alternative to an established fourth speed. Such a reversion to third speed as would merely require that the driving train of the fourth speed be abnormally broken while the power was left on to simultaneously take up the drive of the load through the third speed while the transmission, in reaction to the third speed thus brought into play would automatically cause normal cancellation of the fourth speed.

Another object of the present invention, and particularly in connection with providing an automatic four forward speed transmission with the speeds divided into acceleration range and optional step-down reversion as described is, the provision of selectable fixed forward and reverse gears as positively establishable alternative drives between the driving and driven members and establishable in conjunction with declutching a normally engaged friction clutch provision such that alternative fixed gears, over the automatically variable speeds, would be selectable for heavy duties. These fixed gears would be advantageous to pull out of mud or sand and provide for parking in gear whereby the engine compression as a brake would be made effectual. Providing a normally engaged but optionally disengageable friction clutch cooperative with these alternative fixed gears, embraces the principal objects of the present invention in that it retains for the driver the customary control, that of declutching and shifting, that he has in connection with the low and reverse gears of current transmissions.

A still further object of the present invention is to provide the automatic range of four forward speeds of a multiplicity of planetary gears in series and in tandem whereby the gear members of all the planetary gear units constituting said series are employed gear operative to give the load-starting lowest or first speed ratio and which multiplicity will be transformed gradually to employ fewer of the planetary gear units as the speed ratio of drive is automatically stepped up.

A still further object of the present invention is to provide four forward speeds obtainable with a multiple of speed responsive automatic (centrifugal) clutches, coordinated with the multiplicity of planetary gear units whereby, in no instance will any one of the centrifugal clutch units be allowed to engage with an appreciable slip period which would incur excessive wear or objectionable engine racing.

It is also a primary object of my present invention to provide a combined selective fixed forward and reverse gear and four forward speed automatic range transmission with automatic declutching responsive to the driving member and with optional declutchability superimposing the automatic clutch functions, all of low cost, long life, compact, light weight, low inertias and all together a highly efficient automatic transmission.

In contrast with the automatic transmission subject of my co-pending application Ser. No. 201,294, filed April 11, 1938, the present invention embraces an automatic range of four forward speeds with first, second and fourth speeds constituting an acceleration range and with the third speed automatic but as an optional alternative-to-fourth speed, while the aforesaid co-pending application embraces an automatic range of three speeds with second, third and fourth speeds constituting an acceleration range, with revertable means for causing the third speed to supplant the fourth speeds and with the first speed of four forward speeds optionally obtainable constituting a selectable fixed forward gear. Aside from these differentials, the two subject transmissions embody different forms of planetary gearing, different coordinations and different arrangements and combinations.

Further objects of my present invention will become apparent as the description thereof proceeds in connection with the annexed drawings and are pointed out in the annexed claims:

Figure 1:
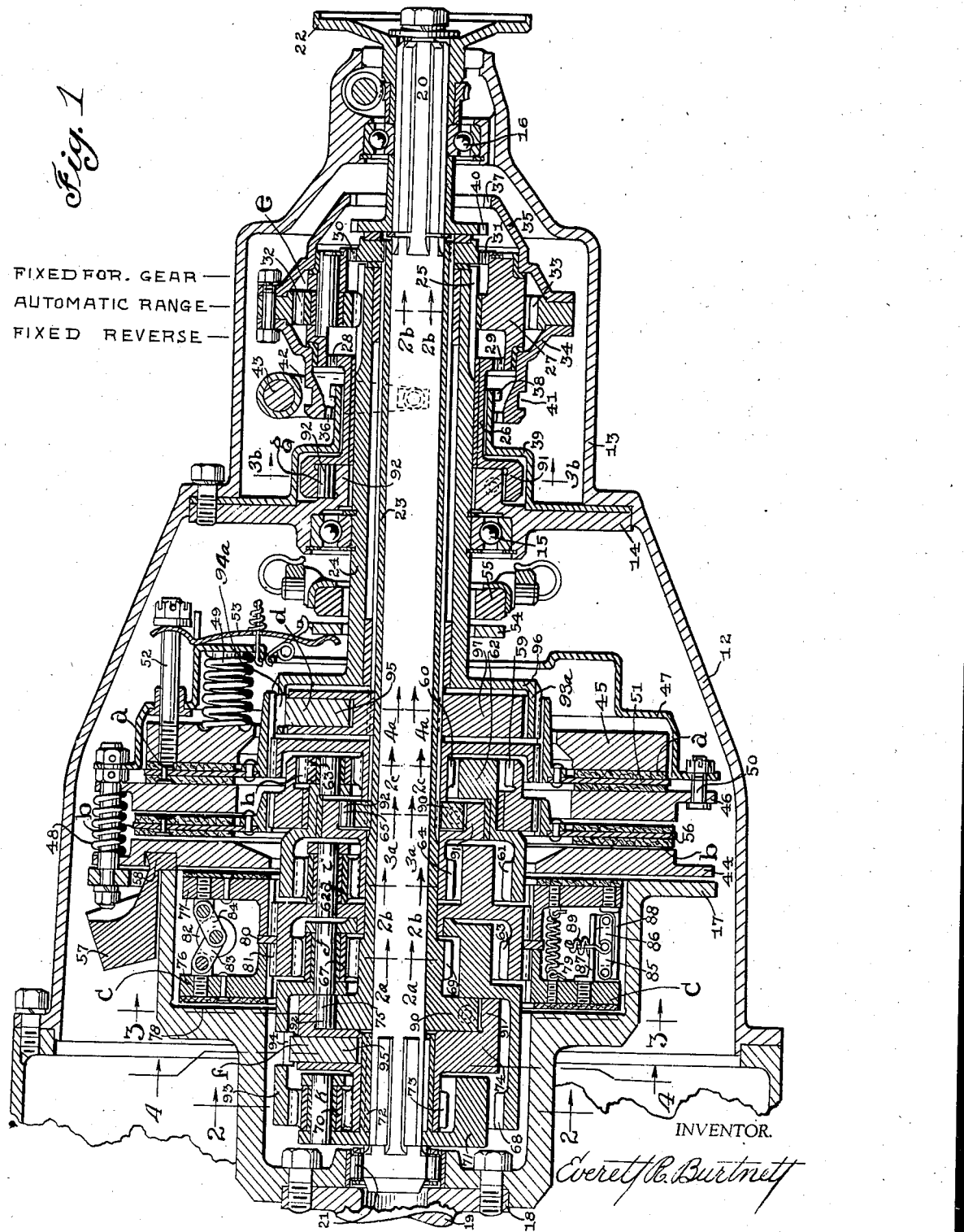
Figure 1 is a longitudinal sectional view of a practical form of an automatic power transmission embodying my present invention.
Figure 2:
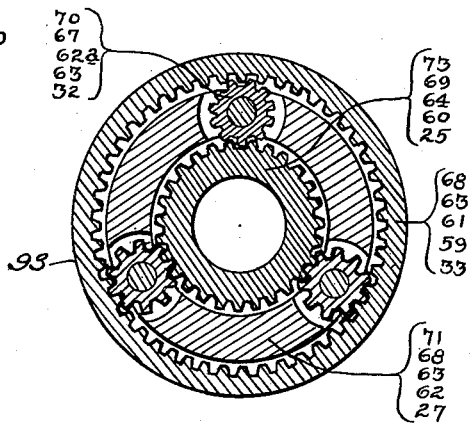
Figure 2 is a vertical transverse view taken on either lines 2—2, 2a—2a, 2b—2b, 2c—2c or 2d—2d of Fig. 1, respectively, illustrating each of the several planetary gear trains employed in the present invention in multiples.
Figure 4:
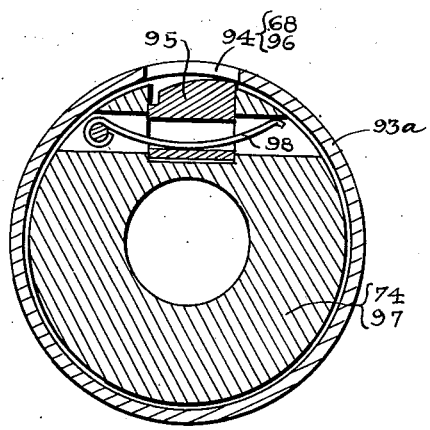

Figure 4 is a vertical transverse view taken on either lines 4—4 or 4a—4a of Fig. 1, respectively, illustrating each of the two suitable forms of positive type centrifugal automatic clutches employed in the present invention, in preference to friction type centrifugal automatic clutches that would suffice in these respective positions and employed in multiples respectively to obtain certain different drive coupling actions simultaneously in response to one momentary deceleration of the driving member.

Referring to the drawings wherein like reference characters designate like parts throughout the several views, in Fig. 1 a clutch housing 12 is shown preferably integral with a gear box 13 and having a detachable intermediate wall 14 supporting a front main transmission bearing 15. A rear main transmission bearing 16 being supported in the end of the gear box 13.

A flywheel 17 is secured to a flanged portion 18 of a shaft 19 and with the latter represents the primary driving member adapted to be driven by the power source or vehicle engine, while a single main transmission shaft 20 extends from a contiguous point in the customary pilot journaled relation, as born by bearing 21, with the driving shaft 19 to a propeller shaft take-off as indicated at 22 and forms a one piece driven transmission member serving as an axle for the entire assembly of transmission and driven clutch elements.

Arranged encircling the forward end of the driven shaft 20 are four planetary gear units respectively designated as on lines 2—2, 2a—2a, 2b—2b and 2c—2c. These comprise a primary drive direct drive input effective coupling consisting of the planetary gear unit on line 2c—2c whose elements are adapted to be connected to rotate as a unit in order to render a drive primarily to the first speed reducing planetary gear unit that is designated on line 2b—2b; the latter in series with and to drive the there adjacent planetary gear unit designated on line 2a—2a, whereby a second reduction in speed by gear drive is effected; and finally the second stage reduced speed of the gear unit (designated as on line 2a—2a) to drive the planetary gear unit designated as on line 2—2, whereby a third reduction in speed is effected and delivered directly to the driven shaft 20. This triple gear driving series of planetary gear units, respectively, those designated as on lines 2b—2b, 2a—2a and 2—2 gear drive operate simultaneously to give a first forward (low) speed ratio from the flywheel 17 to the driven shaft 20 as a transmitting train from the joint operating clutches a and b. A second centrifugal automatic clutch c, operative in response to the driving element of the intermediate planetary gear unit designated as on line 2a—2a, is adapted to engage the flywheel 17 when the carrier element of this clutch c has attained a predetermined speed and thereby directly drive the intermediate planetary gear unit designated as on line 2a—2a, whereby the ratio of drive from the flywheel 17 to the driven shaft 20 is changed from first to second speed, being now the combined gear drive merely of gear units designated as on lines 2a—2a and 2—2. This provides for omitting the gear unit designated on line 2b—2b to effect the second speed. Later, a preferably positive centrifugal automatic clutch unit d, operative upon a momentary deceleration of the driving member 19, is adapted to engage and lock the entire assembly operatively disposed between the driving and driven members 19 and 20, to rotate as a unit giving the fourth forward (direct drive) speed.

The planetary gear unit e forms the drive preselector and is adapted to occupy the intermediate longitudinally shiftable position in which it is shown to establish the remainder of the transmission mechanism automatically drive operatively establishable between driving and driven members 19 and 20; to be shifted a first step forwardly or rearwardly to establish the automatic transmission neutral; to be shifted fully forwardly to leave the automatic transmission in neutral and to establish a fixed reverse gear drive, in conjunction with the normally engaged clutch unit a, between the driving and driven members 19 and 20; and adapted to be shifted fully rearwardly to leave the automatic transmission in neutral and to establish a fixed forward gear drive, in conjunction with the normally engaged clutch unit a, between the driving and driven members 19 and 20.

Once the centrifugal clutch d has engaged and established the fourth automatic speed, the more or less conventional normally engaged clutch a is adapted to be declutched at the option of the operator while the driving member 19 is simultaneously maintained accelerating in order to obtain the disengagement of the centrifugal clutch d whereby the drive is reverted from fourth downwardly to a lower gear while the power flow is maintained in full driving influence upon the driven shaft 20. Simultaneous with the engagement of the fourth speed clutch unit d under the previously described conditions of momentary deceleration of the driving member 19, will be the engagement of another positive type centrifugal automatic clutch f operable to lock the last gear driving planetary gear unit contributory to the automatic range, being the gear unit designated as on line 2—2, to rotate as a unit. So that, upon obtaining the release of the clutch d the subsequent reversion from the direct drive fourth speed is to the singular gear drive of the intermediate planetary gear unit designated as on line 2a—2a. This condition of the latter planetary gear unit operating singularly through the locked gear unit designated as on line 2—2, gives only a slight reduction of speed or a third speed ratio of forward drive from the driving member 19 to the driven shaft 20.

It will be found that, upon the engagement of the clutch c, accumulatively with respect to prior engagement of clutch b and normal engagement of clutch a, the planetary gear unit designated as on line 2b—2b will become locked to rotate as a unit by virtue of the driving and driven elements of this planetary gear unit both being coupled to rotate with the flywheel 17. To render the clutch c capable of assuming the drive of the second speed singularly with a short slip period, a special device is provided with this clutch making for its efficient centrifugal automatic engagement. This device will be described further on in the more detailed description.

More in detail, a practical construction of the present invention includes, a reaction shaft 23 sleeved in relation to the driven shaft 20 but adapted to normally stand still. A clutch shaft 24 in turn encompasses the reaction shaft 23 and has as an integral part a sun gear 25 of the rear most or shiftable planetary gear unit e. A master reaction, one-way stop or cam and roller type overrunning brake unit g is associated with the stationary wall 14 and has a rearwardly extending driver part thereto designated by 26. Shiftable with the planetary gear unit e is a planet gear carrier member 27 thereof. With jaws 28 on the driver 26 to the one-way stop brake g and mate jaws 29 on the planet gear carrier 27 together with jaws 30 on the reaction shaft 23 and mate jaws 31 on the planet carrier 27, all for engagement when the shiftable planetary gear unit e occupies the intermediate position in which it is shown. The reaction shaft 23 is thereby established in connection with the master reaction brake unit g to be prevented from rotating backwards under influences of forward rotative efforts in the forwardly disposed automatically variable planetary gearing.

Planet gears 32 are carried rotatably on the carrier 27 and mesh with, and are slidable longitudinally relatively to, the sun gear 25. An internal gear 33 meshes with these planet gears 32 and has opposite longitudinally extending portions 34 and 35, respectively, terminating (forwardly) at a decreased diameter of internal clutch teeth 36 and (rearwardly) at a decreased diameter of internal clutch teeth 37. The internal gear 33 planet carrier 27 and planet gears 32 constitute a longitudinally shiftable unit.

Fixed brake jaws or teeth 38 are provided on a stationary bracket 39 extending rearwardly from the intermediate wall area dividing the two compartments of the housing 12, and a series of driven clutch jaws or teeth 40 are connected integral or to rotate with the driven shaft 20.

To facilitate shifting the gear unit e, a groove 41 is formed in the forwardly extending portion of the internal gear 33 and in which groove is fitted the ends of a bifurcated shifter fork 42, the latter suspended for rock motion from an actuator shaft 43.

By shifting the gear unit e forwardly, the clutch jaws 29 and 31, respectively, are first taken out of engagement with clutch jaws 28 and 30 whereby the reaction shaft 23 is disconnected from the one-way stop brake unit g and thereby left free to rotate in either direction. This selects the automatically drive establishable or variable gearing in neutral. Or, by shifting the gear unit e fully forwardly the clutch jaws 29 of the planet carrier 27 are brought into engagement with the stationary brake jaws 38, thereby locking the planet carrier 27 non-rotatable in either direction. While the same full forward shift of the gear unit e brought the clutch jaws 37 of the internal gear 33 into engagement with the driven clutch jaws 40 of the driven shaft 20, whereby, under forward rotative efforts of the sun gear 25 the planet gears 32 are driven around their respective axes and operate to drive the internal gear 33 in reverse at reduced speed. The engaged jaws 37 and 40 operating to transmit this reverse speed to the driven shaft 20. Hence, through the medium of the normally engaged clutch a and clutch shaft 24 jointly connecting the sun gear 25 to the driving member 19, a fixed or permanent reverse gear drive of two-way drive characteristics is established between the driving and driven members 19 and 20, which incidentally renders the automatic transmission means in neutral.

By shifting the gear unit e rearwardly, the clutch jaws 29 and 31, respectively, are first taken out of engagement with the jaws 28 and 30 whereby the reaction shaft 23 is disconnected from the one-way stop brake g and thereby left free to rotate in either direction. This selects the automatic gearing in neutral. Or by shifting the gear unit e fully rearwardly the jaws 36 of the internal gear 33 are brought into engagement with the stationary jaws 38 thereby locking the internal gear 33 against rotating in either direction. While the same full rearward shift of the gear unit e brought the clutch jaws 31 of the planet carrier 27 into engagement with the driven jaws 40 of the driven shaft 20. Whereby, under forward rotation efforts of the sun gear 25 the planet gears 32 are caused to track in the rigidly held internal gear 33 and consequently operate to drive their carrier 27 forwardly at reduced speed. This reduced forward speed is in turn transmitted by the engaged jaws 31 and 40 to the driven shaft 20. Hence, through the medium of the normally engaged clutch a and clutch shaft 24 connecting the sun gear 25 to the driving member 19, a fixed or permanent low forward gear drive of two-way drive characteristics is established between the driving and driven members 19 and 20. In either of these permanently selectable fixed gears, the vehicle may be parked in gear against the compression of the vehicle engine as a brake. The clutch a has a two fold purpose in the present invention. One being for disengagement to establish or disestablish either the fixed forward gear or the fixed reverse gear. In this manner these two gears are left conventional. Eliminating any opportunity for the centrifugal automatic clutches to handicap easy forward and reverse gear manipulation in parking the car to the curb or the like, as speed responsive clutches are inclined to do under such conditions if left with any direct relation to such requirements. The present invention therefore provides for completely circumventing the automatic transmission with either forward or reverse positive gears.

Completing the driving member assembly are opposite presser driving clutch plates 44 and 45, an intermediate driving clutch plate 46 and a back plate 47, all rotatable with the flywheel 17. Retractive springs 48 normally but yieldingly hold the presser plate 44 in a forwardly retracted position and the intermediate clutch plate 46 in a rearwardly retracted position, while master clutch springs 49 normally operate to press the presser plate 45 forwardly. Bolts 50 operate to prevent the intermediate plate 46 from giving away to any urge from the rear.

A driven clutch disk 51, between the presser plate 45 and the intermediate plate 46, is normally engaged or clutch packed between plates 45 and 46 under pressure of the master springs 49. Bolts 52 threaded into apertures provided therefor in the presser plate 45 and a system of throw-out fingers or levers 53 coacting with these bolts 52, together with the customary clutch throw-out bearing instruments 54 and 55, complete the normally engaged but optionally disengageable clutch unit a, whereby the clutch shaft 24, carrying the clutch disk 51 rotatable therewith, is normally coupled rotatable with, but optionally disconnectable from, the flywheel 17.

A driven clutch disk 56 is arranged between the presser plate 44 and the intermediate clutch plate 46 and master centrifugal weights 57, having feet portions 58 operatively wedged between the flywheel 17 and presser plate 44, operate, upon the driving member (flywheel 17) attaining a first predetermined speed, to engage and clutch pack the driven disk 56 between the plates 44 and 46.

A novel coordination of the centrifugal automatic clutch unit b and the normally engaged clutch unit a appears at this point, to wit: By virtue of an internal gear 59 carrying the driven clutch disk 56 of the driving-member speed-responsive clutch unit b rotatable therewith; a sun gear 60 connected to rotate with the driven clutch disk 51; and a rotatably mounted member forming a driving internal gear 61 to another planetary gear unit and forming a carrier 62 for planet gears 63 the latter meshing with the gears 59 and 60, a first planetary gear unit h is formed as a drive coupling device to drive the internal gear 61 from the flywheel 17 when both clutches a and b are engaged. By this combination, normal engagement of the clutch a leaves the initial drive coupling planetary gear unit h non-statically gear operative as an idler to spin the clutch disk 56 consequently imparting no drive to the planet carrier 62 and internal drive gear 61. Engagement of the clutch b in response to the driving member 19 and flywheel 17 being accelerated will however operate to lock the planetary gear unit h statically gear operative to rotate as a unit whereby the internal gear 61 becomes coupled to rotate with the flywheel 17 in a manner that may be abnormally uncoupled by the driver exercising his option of causing disengagement of the clutch a. Hence, an initial drive coupling system embodiment of planetary gearing h and combined, respectively, spring engaged and speed responsively automatically engageable clutches a and b is provided whereby the drive coupling circuit may normally be closed by accelerating the driving member and may abnormally be opened by disengaging the clutch a without interfering with the centrifugal or speed responsive automatic clutch b. An important mechanical advantage resides in this automatic but optionally controlled drive coupling mechanism, in that the duty of the primary drive coupling centrifugal automatic clutch b is appreciably reduced, and likewise the duty of the optionally disengageable clutch a reduced, by the planetary gearing h operating to share the power transmitted between the two clutches a and b. This makes for long lived practical adaptation of the centrifugal automatic friction clutch to initially start the load and for lower capacity and easier disengagement of the clutch a. It will be seen that holding the clutch a disengaged will render automatic engagement of the clutch b inconsequential in promoting a drive to the internal gear 61. Hence, provision is made to race the engine without incurring a drive, by disengaging one clutch and thereby allowing for normal engagement of a speed responsive clutch with no effect.

Completing the first reduction planetary gear unit i of the automatic range with the internal drive gear 61 are, a system of planet gears 62a carried by an intermediate rotatably mounted member forming an internal drive gear 63 to another driven planetary gear unit; a sun gear 64 acting as the orbital gear to the first reduction gear unit i; and an individual one-way stop or reaction brake unit of the cam and roller type designated by 65. The latter, resting backwards against the reaction shaft 23, operates to individually prevent the sun gear 64 from rotating backwards, hence sustaining the planet gears 62a to drive the internal gear 63 under influence of rotative efforts imparted to the planet gears 62a by the internal gear 61.

Completing the second reduction planetary gear unit j of which the internal drive gear 63 is a constituent, is another system of planet gears 67 carried by another rotatably mounted intermediate member forming an internal drive gear 68 to still another planetary gear unit; and a sun orbital gear 69 forming an integral part of the reaction shaft 23. This second planetary gear unit j operates to step down the output speed of the planetary gear unit i.

Completing the third reduction planetary gear unit k, of which the internal gear 68 is a constituent, is another system of planet gears 70 carried by a member 71 which has a hub portion 72 splined to the driven shaft 20, whereby the third reduction planetary gear unit k operates to drive the driven shaft 20; and an orbital sun gear 73 having an enlarged portion 74 through which the sun gear 73 individually reaches the reaction shaft 23 through the medium of an individual one-way stop or reaction brake unit 75 of the cam and roller type operatively disposed between the enlarged portion 74 of the sun gear 73 and the reaction shaft 23.

The third reduction planetary gear unit k operates to step down the speed of output of the second reduction gear unit j so that the combined reductions of the three planetary gear units i, j and k operate in three steps to give a first speed ratio between the dual clutch-closed coupling circuit of the first planetary gear unit h and the forward end of the driven shaft 20. Thus, by engagement of the clutch b, in response to the driving member 19 being accelerated above idling, supplementing the normal engagement of the clutch a, the drive coupling planetary gear unit h becomes locked to rotate as a unit and the power flows therefrom through planetary gear units i, j and k to the driven shaft 20, giving the first speed ratio to pick up the load of driven member 20.

Carried by the internal drive gear 63 of the intermediate reduction planetary gear unit j is the secondary centrifugal automatic friction clutch c comprising, preferably, a pair of driven clutch plates 76 and 77 each splined non-rotatable but individually longitudinally movable on the drive gear member 63 of the intermediate planetary gear unit j. These plates 76 and 77 are provided with the usual clutch facing but on their outer faces only, whereby the forward plate 76 may clutch engage a face portion 78 of the flywheel 17 forming a bottom pressure plate to the driven plate 76, and whereby the rearward plate 77 may clutch engage the front face of the presser plate 44 of the primary centrifugal automatic clutch b forming a bottom pressure plate in this instance to the plate 77. Master retractive springs 79 operate to constantly urge the plates 76 and 77 to occupy retracted positions at rest toward each other against a centrally disposed snap ring 80, the latter being positioned in a groove therefor in the splines 81 of the carrying gear 63. And master centrifugal weights 82, suspended by links 83 and 84 between the plates 76 and 77, are provided of a coefficient to overcome the springs 79 at a comparatively low speed of rotation. While subcentrifugal weight links 85 and 86 secured by bosses 87 and 88, respectively, to the plates 76 and 77, and normally urged to occupy a dead-center toggle-state by sub-retractive springs 89, operate to prevent the plates 76 and 77 from being actuated by the master weights 82 until a predetermined comparatively high speed of rotation is attained by the carrying gear 63, corresponding to 15 M. P. H. vehicle speed attainment under drive of the first speed, in the way of example, has been reached. The action of the subcentrifugal weight links 85 and 86 is to time the release of the plates 76 and 77 in accordance with a predetermined driven speed attainment by the transmission and also serves as means, whereby the master weights 82 may have an unusually high coefficient as compared to the master clutch retractive springs 79, but still be restrained from initiating engagement of the plates 76 and 77 until the weights 82 have sufficient centrifugal force to effect a full capacity engagement of the second speed clutch unit c with a minimum slip period. This assures that the first automatic change speed transition, that is, from first to second speed, may take place under full power without incurring excessive or objectionable slip of the effecting friction clutch to that end.

Figure 3:
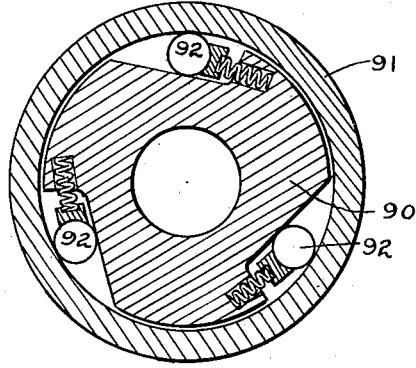
Figure 3 is a vertical transverse view taken on either lines 3—3, 3a—3a or 3b—3b of Fig. 1, respectively, illustrating each of the several reaction one-way stop or overrunning brakes employed in the present invention in multiples.

Referring more particularly to Figure 3, a more detailed designation of the parts of the master reaction brake g and of the sub-reaction brakes 65 and 75, respectively, found on lines 3—3, 3a—3a and 3b—3b of Fig. 1 is made, to wit: A cammed hub 90 forms the restraining no-back or reaction element, a concentric race 91 forms the brake annulus through which the tendency to rotate backwards is applied, and roller brake members 92 operate to wedge between the cammed hub 90 and the annulus 91 and lock the latter against rotating backwards. Hence the brake 75 operates to individually prevent backwards rotation of the sun gear 73 of the planetary gear unit k under forward driving rotative efforts from the internal gear 68 thereto, but permits forward rotation of this sun gear under conditions of a reverse of torque; the brake 65 individually operates to prevent backwards rotation of the sun gear 62 of the gear unit i under forward driving rotative efforts of the internal gear 61 thereto, but permits the latter unit to be locked to rotate forwardly as a unit as is the case upon clutch c engaging supplementary to engaged clutches a and b; and the master reaction brake g operates, through the intermediary mediums of the shiftably selected clutch jaws 28 and 29 and planet carrier 27 and clutch jaws 30 and 31 to prevent rotation of the reaction shaft 23 backwards and in turn supporting both the individual or sub-reaction brakes 65 and 75 as individual one-way stop instruments.

Referring now to Fig. 4, with sub-reference to the clutch unit f, an annulus 93a is formed by the internal gear 68 of the gear unit k, with an opening 94a therein to receive a centrifugal weight forming a jaw clutch element 95. The latter in turn being carried by the enlarged portion 74 of the sun gear 73 of the gear unit k so that, upon sufficient speed of the sun gear 73 and upon the parts 74 and 68, or 93 and 95, reaching synchronism, the element 95 will enter the opening 94 and thereby lock the planetary gear unit k to rotate as a unit; and secondly, referring to Fig. 4 and sub-referring to the clutch unit d, an enlarged diameter 96 of the clutch shaft 24 serves as the annulus 93a to this clutch unit, with the opening 94a formed therein and with the centrifugal weight clutch element 95 carried by a frame 97 provided therefor and in turn mounted non-rotatable on the reaction shaft 23. Upon sufficient speed of the reaction shaft 23 and upon the parts 96 and 97, or 93 and 95, reaching synchronism this clutch unit d will engage, and consequently lock the reaction shaft 23 to rotate with the flywheel 17. In turn this engagement of clutch d causes the entire transmission assembly to rotate as a unit, thus causing the transition from automatic second speed to automatic fourth speed. Simultaneous engagement of the clutch units d and f is contemplated so that, any time following the establishment of the fourth speed, if the driver will cause the clutch a to be momentarily disengaged, the engaged clutch c, operating to directly drive the internal gear 63 of the gear unit j, will find the gear unit k locked to rotate as a unit, leaving only the gear unit j for gear driving, whereby the third of the four forward speed automatic range will come into play as an alternative to the fourth speed now momentarily and abnormally disestablished, as it is, by the disengagement of the clutch a. As a reaction to the forward driving rotative efforts of the internal gear 63, the assembly comprising the reaction shaft 23 and the clutch shaft 24, both locked by the engaged clutch d, will be caused to decelerate to a state of rest against the one-way stop agency of the brake g. Incidental to this deceleration, the engaged clutch d will almost instantly reach a low speed at which it can no longer remain centrifugally engaged. Consequently the fourth speed will become normally disestablished in favor of the engaged clutches c and f operating to render the third speed gear drive of the gear unit j effective as a transmitting medium between the flywheel 17 and driven shaft 20, all as a result of the clutch a being momentarily disengaged and whereby, this accomplished, it may now be released to normal engagement.

*Ratios of automatic speeds.*—First, assume the primary drive coupling planetary gear unit $h_1$ to have a sun gear 60 of thirty-three teeth and an internal gear 59 of fifty-eight teeth. The driving member speed responsive automatic clutch b, associated with the internal gear 59, and operative to automatically close the circuit of the primary driving (static-gear) coupling comprised of the planetary gear unit h, when the driving member 19 (engine) is accelerated above idling, will transmit substantially 63 per cent of the power flow through the gear unit h, while the clutch unit a, associated with the sun gear 60, will transmit the remaining 37 per cent. This combination of a normally engaged but optionally disengageable friction clutch driving an epicyclic gear train from one side and a speed responsive automatic friction clutch driving the epicyclic gear train from the other side, whereby the speed responsive clutch normally automatically closes the drive coupling circuit of the epicyclic gear train, but which may be abnormally opened at any time by disengaging the normally engaged clutch, has the following important advantages: It lowers the duty of the load starting speed responsive friction clutch to where its slip ratios are no more than desired for a jerkless pick-up of the load; it provides for optionally disconnecting the drive, that is for abnormally opening the drive coupling h otherwise controlled by the speed responsive automatic clutch b, by singularly disengaging the normally engaged clutch a, thus obviating all inter-relations as of the two clutch units a and b themselves to the one coupling device, which is particularly advantageous in connection with obviating interference with the speed responsive automatic clutch in order to render same non-drive effective; and it provides the normally engaged clutch a, adapted to optional disengagement at the will of the operator, for association with selective positive gear driving connections between the driving and driven members whereby, among other virtues, the vehicle may be parked in gear or established in fixed gear drives in which the automatic transmission functions are rendered ineffective.

Secondly, assume the ratio of speed reduction of the first driven planetary gear unit i to be 1:47, the second driven planetary gear unit j to be 1:47 and the third driven planetary gear unit k to be 1:47. The three steps of simultaneous speed reductions by all three gear units i, j and k will give a first speed ratio of 3:32 to 1; while two steps of simultaneous speed reductions by any two of the gear units i, j and k will give a second speed ratio of 2:26 to 1; while a single step of speed reduction by any one of the gear units i, j and k will give a third speed ratio of 1:47 to 1; leaving a function of direct drive coupling between the driving shaft 19 and the driven shaft 20 for the fourth speed.

*Operation of four forward speed automatic range.*—Assuming the planetary gear unit e to be intermediately positioned as shown, the reaction shaft 23 is thus connected through engaged jaws 30 and 31, thence through the planet carrier 27 and thence through engaged jaws 28 and 29 to the master one-way stop or reaction brake g; while the sun orbital gear 64 of the first driven planetary gear unit i is connected against rotating backwards by its individual one-way stop brake 65, the latter forming a sub-reaction brake acting on the reaction shaft 23 and finally against the master reaction brake g; while the sun orbital gear 69 of the second driven planetary gear unit j is integral with the reaction shaft 23, thus requiring that the reaction shaft 23 act as an individual orbital or reaction element to the centrally disposed driven planetary gear unit j; and while the sun orbital gear 73 of the third driven planetary gear unit k is connected against rotating backwards by its individual one-way stop brake 75, the latter forming a sub-reaction brake acting on the reaction shaft 23. The entire assembly of automatically controlled planetary gear units i, j and k are thus rendered drive operable.

*First speed.*—The driver accelerates the engine from its idling state. This increases the speed of the driving member 19 and flywheel 17 sufficiently to give the master centrifugal weights 57 sufficient centrifugal force to actuate the presser plate 44 rearwardly, overcoming the tension of the retractive spring 48, and subsequently clutch packing the driven disk 56 rearwardly against the intermediate driving clutch plate 46. Since the clutch a is normally engaged, engagement of the automatic clutch b will have the effect of locking the planetary gear unit h to rotate as a unit and thereby deliver the speed of the flywheel 17 to the internal gear 61. The latter being thus driven forwardly at engine speed and the reverse tendencies of the sun gear 64 being arrested firstly by the one-way stop brake 65 and finally by the master one-way stop brake g, will have the effect of causing the internal gear 63 to be driven forwardly at 1:47 reduction relative to the engine speed. Consequently, in turn, the reverse tendencies of the sun gear 69 being arrested by the master one-way stop brake g, the internal gear 68 will be driven forwardly at 2:26 reduction relative to the engine speed. And consequently, in turn, the reverse tendencies of the sun gear 73 being arrested firstly by the one-way stop brake 75 and finally by the master one-way stop brake g, will have the effect of driving the planet carrier 71 and the load carrying driven shaft 20 rotatable therewith forwardly at 3:32 reduction relative to the engine speed. The vehicle is thereby accelerated from a standing start in the 3:32 first forward speed. This is compatable with a so-called fast axle ratio provision at the axle differential as the final reduction to the driving wheels of the vehicle, in the way of example, of 3:40 as compared to something like 4:25 in vehicles with three forward speed transmissions.

*Second speed.*—When the vehicle has reached a speed, by way of example, of 12 to 15 M. P. H., the driving internal gear 63 of the intermediate of the three planetary gear units i, j and k will have a corresponding relative speed. In connection with this relative driven member speed of the internal gear 63, the centrifugal automatic clutch c carried thereby incidentally has reached the speed at which the centrifugal force concentrated at the joint between the links 85 and 86 becomes greater than the tension of the spring 89. This results in the collapse of the normal dead-center-toggle effect of the links 85 and 86. Consequently the plates 76 and 77 are released to yield to the force of the centrifugal weights 82 tending to spread these plates apart. The clutch c thereby engages, coupling the internal gear 63 to rotate with the flywheel 17 and the driving member 19. It will be seen that the internal gear 61 was already rotating with the flywheel 17. Hence the accumulative connection of the internal gear 63, which carries the planet gears 62a, also to rotate with the flywheel 17 operates to lock the planetary gear unit i to rotate as a unit. The sun gear 64 of the then locked planetary gear unit i overrunning the reaction shaft 23 by virtue of the individual one-way stop brake 65. The drive is now through the two stage speed reduction steps of planetary gear units j and k, giving the second speed ratio of 2:26 reduced speed drive of the driven shaft 20 from and relative to the speed of the driving member 19. A virtue of this first speed ratio of drive transition upward upon getting the vehicle up to the comparatively low speed at which first speed begins to lose its accelerating rate is, the characteristic of the accumulating clutch c to engage under full power and to do so after being restrained until it had sufficient built-up centrifugal force to engage with an almost nil slip period.

*Second speed continuous until momentary deceleration of driving member (engine).*—Automatic change to fourth speed is therefore control superimposed by the driver. Means to this end are provided in the form of a centrifugal automatic clutch d (preferably a positive type) and depending upon synchronism of parts 96 and 97, or 93 and 95, to engage, which can only be attained by allowing the driving member 19 to momentarily decelerate.

*Third speed is mobilized simultaneously with automatic change from second to fourth speed so that third speed is omitted in the acceleration range but made ready for use as an alternative-to-fourth speed upon the latter being optionally disestablished.*—This provides for retaining the better accelerating value of the second speed until the fourth speed cruising range is advantageous, and means to this end are provided in the form of a centrifugal automatic clutch f (preferably a positive type) and adapted to engage only when synchronism of parts 74 and 68, or 93 and 95, reach synchronism, and incidentally for simultaneous engagement with the clutch d under the same reaction to the momentary deceleration of the driving member 19 (engine) for the change from second to fourth speed. The change to fourth speed from second, therefore leaves only the gear unit j gear drive operative (non-statically) to transmit power in the event the fourth speed effective clutch d was disengaged at a speed sufficient to maintain the clutch c engaged. In that case the planetary gear unit j would gear drive singularly under drive of the clutch c, and through the direct coupling of the planetary gear unit k, now locked by the clutch f, to the driven shaft 20 at 1:47 reduction or third speed.

*Fourth speed.*—Having attained any desired vehicle speed under acceleration in the second speed, the driver lifts his foot momentarily from the accelerator pedal. This results in the driving member 19 (engine) slowing down immediately under the engine compression. Subsequently, the second speed driving internal gear 63 slows down with the driving member 19, which in turn tends to slow down the internal gear 68. Simultaneously in reaction to this reverse of torque, the sun gears 73 and 69 are rotated forwardly until parts 93 and 95, respectively of both clutches d and f, reach synchronism. These clutches d and f will operate to centrifugally engage almost simultaneously as a result of this momentary deceleration of the driving member 19. Resumption of driving member acceleration, that is depressing the accelerator pedal after its momentary release, finds all the clutches, specifically, a, b, c, d and f engaged. Consequently the entire transmission assembly is locked to rotate as a unit, effecting fourth speed (direct drive) between the driving member 19 and the driven shaft 20. The single relatively rotatable action will prevail at the annulus 91, of the master reaction brake g, revolving as a race over the now idling roller brake members 92 of the same brake unit.

*Transmission remains in fourth speed normally down to 10 M. P. H.*—Since the clutch c is restrained from engaging when its centrifugal weights 82 thereof would normally accomplish that end by the toggle links 85 and 86; and since the clutches d and f can not engage until synchronism of their respective parts have been allowed to attain as a result of momentary deceleration of the driving member 19, the relative coefficients of centrifugal weights and retractive springs, respectively, of all three clutches c, d and f may be such that, once engaged, they will remain so until rotation corresponding to 10 M. P. H. deceleration of the vehicle in fourth speed has been reached. This provides for the desired variations in speed ratios through the acceleration range of transmission performance from the standing start of the vehicle, and gives a long range of fourth speed in effect downward so that, ordinarily the transmission would cruise in direct drive well downward into a comparatively low speed of vehicle operation at which automatic reversion to gear driving would be advantageous in any case.

*Optional third speed alternative to fourth speed.*—In fourth speed, at any car speed, with the clutches a, b, c, d and f all engaged and the entire transmission assembly coupled as a unit rotatively with the driving and driven members 19 and 20, the transmission may be caused to go into third speed by momentarily depressing the customary clutch pedal (not shown) while simultaneously depressing the accelerator pedal (also not shown). This results in the clutch a being momentarily disengaged while the driving member speed, through clutch c to the internal gear 63 of the only open planetary gear unit j, is maintained urging acceleration upon the driving train therebeyond. As a consequence this momentary disengagement of the clutch a, the centrifugally engaged (fourth speed effective) clutch d is loosened from the driving member 19. Consequently in turn the reaction shaft 23 is freed to react to the retrograde rotative tendency of the sun gear 69 and comes to rest against the noback or one-way stop master reaction brake g.

The planetary gear unit j therefore gear drive operates singularly to drive the driven shaft 20 through the medium of the planetary gear unit k (the latter now locked by the clutch f) at 1:47 reduction, the instant the clutch a is disengaged and under the conditions of the constantly accelerated driving member 19. A secondary result of the reaction shaft 23 being freed and coming to rest under the driving effort of the third speed planetary gear unit j, is the deceleration of the engaged (fourth speed) clutch d with the reaction shaft 23 during the moment the clutch a is disengaged. When the clutch d reaches a predetermined speed of deceleration the spring 98 thereof overcomes the centrifugal force of the centrifugal clutch element 95. Consequently the engaging clutch element 95 is withdrawn from the opening 94. This all occurs almost instantly, so that the clutch pedal need hardly be more than depressed and released, while the engine is simultaneously constantly accelerated, to obtain the release of the clutch d and the normal establishment of the third speed. Thus I have described a third speed which will omit itself from the stepped speeds of the accelerating range of the three forward speeds, namely, the first, second and fourth speeds, but a third speed which avails itself for the driver to obtain at his option without cessation of the power from constant application to the load. That is, incurring not the slightest interruption in the drive, if the driver will simply depress the clutch pedal while accelerating the engine rather vigorously and thereupon release the clutch pedal. Third speed will prevail as long as the engine is accelerated sufficiently to promote forward driving rotative efforts in transmission toward the driven member 20. Upon momentarily decelerating the driving member 19 (as in the case of obtaining the change from second to fourth speed), the parts 93a and 95 of the clutch d will again reach synchronism and the clutch d engage, reestablishing the transmission in fourth.

As was previously explained, the advantage of second speed prevailing in the accelerating range for its higher torque value until the fourth speed is desired, is obviously an important factor to improved vehicle acceleration. Conversely; the advantages of the novel means embodiment of the present invention for the third speed to come into readiness to be used as an alternative-to-fourth speed; and especially the novel provisions and coordination whereby the transition from fourth to third speed is brought under control of the driver, such that he may cause same to come into play without interruption of full power acceleration of the vehicle by simple depressing and then releasing the customary clutch pedal, are obvious.

*Permanent low forward or reverse gears.—* Under any condition wherein it would be advantageous to permanently two-way drive lock the vehicle driving wheels to the engine, either for sustained low forward or reverse driving, or to park the vehicle in gear against the engine compression as a brake, the following conventional requirements may be followed: To select the transmission in fixed low (a permanent positive low forward gear), the clutch a is declutched and the shifter 42 actuated to shift the planetary gear unit e rearwardly until the clutch jaws 31 have engaged the jaws 40 of the driven shaft 20, and simultaneously whereby the jaws 36 of the internal gear 33 will have engaged the stationary jaws 38. This detaches the reaction shaft 23 completely from its one-way stop brake g, and thereby renders all functions of the clutches b, c, d and f as well as the planetary gear units i, j and k drive-ineffectual. In other words, neutralizing the automatic transmission. The clutch a is thereupon released into normal engagement. A positive low speed two-way drive effectual gear is now established from the driving member 19 and flywheel 17 through the clutch a, the clutch shaft 24, the sun gear 25, the planet gears 32 now tracking around the rigidly held internal gear 33, and thus through the driven planet carrier 27 and engaged clutch jaws 31 and 40 to the driven shaft 20. A ratio of 2:12, as between the sun and internal gears 25 and 33, thereby produces a 3:12 fixed reduction speed of this selectable low forward gear between the driving and driven members 19 and 20. Similarly, to select the transmission in fixed reverse (a permanent positive low sped reverse gear), the clutch a is declutched and the shifter 42 actuated oppositely to shift the planetary gear unit e forwardly until the clutch jaws 29 of the planet carrier 27 have engaged the stationary jaws 38 and simultaneously engaged the jaws 37 of the internal gear 33 with the jaws 40 of the driven shaft 20. This also detaches the reaction shaft 27 completely from its one-way stop brake g and thereby renders all functions of the clutches b, c, d and f as well as the planetary gear units i, j and k drive ineffectual. The clutch a is thereupon released to again normally engage. A positive two-way drive effectual gear, reversing the rotation as between the driving member 19 and the driven member 20, is now established, giving a 2:12 reduction reverse drive therebetween.

Thus it will be seen that I have provided a combined selective fixed forward or reverse gear, or alternatively establishable four forward speed automatic transmission; having particularly, the advantageous characteristics in the automatic range that the third speed will omit itself from the accelerating speed ratio steps but avail itself for optional use as an alternative-to-fourth speed for flash accelerations and super-performance incurring no interruption in power in obtaining the optional transition downward out of fourth speed into the third speed; embodying only the simplest and best principles in clutch and planetary gear construction; providing an assembly which completely rotates as a unit in the top speed, thus obviating superfluous mechanical losses while transmission is in direct drive; comparatively light in weight; compact; lending itself as a whole to comparatively easy and inexpensive manufacture; and lending itself to easy assembly and disassembly.

It will be understood that various changes, including the size, shape, and arrangement of parts, may be made without departing from the spirit of my invention, and it is not my intention to limit its scope other than by the terms of the appended claims.

What is claimed is:

1. In a change speed transmission, the combination of a driving member; a driven member; automatically variable change speed transmission mechanism for progressively changing the gear ratio between the driving and driven members from low speed to second speed to fourth speed including automatic clutch mechanisms including a distinctly automatic operating clutch unit for each the low, the second and the fourth ratios; and means including a normally but yieldingly engaged friction clutch mechanism for completing the driving connections of each the low, the second and the fourth ratios between said driving and driven members and disengageable under control of the operator, and means automatically operable upon a temporary return of said normally engaged clutch to disengaged condition with accompanying acceleration of the driving member to change the gear ratio from fourth to third whereby the speed of the driving member with respect to that at which it was operating to drive the driven member through the fourth speed ratio may be increased in driving said driven member under torque by temporarily disengaging said normally engaged clutch while maintaining said driving member under sufficient power to immediately step the driving speed and torque flow up to take the load of the driven member at the third gear ratio.

2. In a change speed transmission, the combination of a driving member; a driven member; automatically variable change speed transmission mechanism for progressively changing the gear ratio betwen the driving and driven members from low to second to direct drive fourth including a multiplicity of automatic speed responsive clutch mechanisms adapted for substantially simultaneous engagements upon a temporary reduction in the speed of the driving member relative to the driven member, one automatic clutch of said multiple adapted for establishing said direct drive fourth speed ratio to supplant the second gear ratio between said driving and driven members and another of the simultaneously engaging multiple of clutches adapted for establishing the driving connections of third gear ratio mobilized between said members incidental to the automatic change from second gear ratio to direct drive fourth speed ratio; means including an overrunning brake in series in and permitting the mobilized driving connections of said third gear ratio to be established without interfering with the established fourth speed ratio and means operable at the option of the operator for abnormally disestablishing said fourth speed ratio under accompanying conditions of said driving member being constantly power accelerated thereby to facilitate normal automatic disestablishment of said fourth speed ratio, whereby the hitherto automatically mobilized driving connections of said third gear ratio may instantly assume the load of said driven member at the stepped up speed of said driving member incurred during the infinitesimal interim of the operator bringing said optional means into and out of use.

3. In a change speed transmission, the combination of a driving member; a driven member; automatically variable change speed transmission mechanism for progressively changing the gear ratio between said driving and driven members from first to second to fourth and for simultaneously mobilizing driving connections of a third gear ratio incidental to the automatic change from second to fourth ratios including a plurality of automatic speed responsive clutch mechanisms, one for establishing said fourth speed ratio under certain conditions and another for simultaneously establishing said third gear ratio mobilized under the same said certain conditions; and means whereby the operator may secure automatic disestablishment of said fourth speed ratio leaving said third gear ratio mobilized to take the load of said driven member under conditions of said driving member being continuously power accelerated, whereby the automatic transmission mechanism may be influenced at the will of the operator to revert downward in speed ratios from fourth to third instead of from fourth to second, under torque.

4. In a change speed transmission, the combination of a driving member; a driven member; automatically variable change speed transmission mechanism for progressively changing the gear ratio between said driving and driven members from low to second to direct drive, the latter constituting fourth speed ratio including automatic speed responsive clutch mechanism for establishing direct drive, operable upon a temporary reduction in the speed of the driving member relative to the driven member whether the driving member is at a low or higher speed; and means for optionally securing disenablement of sufficient of the means complementary to the establishment of fourth speed ratio such that a third speed gear ratio will substitute for the fourth as long as the driving member is not subsequently temporarily reduced in speed relative to said driven member sufficiently to effect a repetition of the automatic change to fourth as heretofore described.

5. In a change speed transmission, the combination of a driving member; a driven member; automatically variable change speed transmission mechanism for progressively changing the gear ratio between said driving and driven members from low to second to fourth and for automatically mobilizing the driving connections of a free-wheeling third speed ratio between said driving and driven members substantially simultaneously incident to the change from second to fourth including a plurality of epicyclic gear trains and automatic drive coupling mechanisms and a one-way operable device, the latter and a distinct coupling unit of said automatic coupling mechanisms associated with certain of the plurality of epicyclic gear trains whereby said certain gear train will be automatically mobilized to give said third gear ratio between said driving and driven members during the establishment of said fourth speed ratio but will be drivingly overruled by the faster speed ratio of the latter; and means for rendering sufficient of the driving connections of the fourth speed ratio inoperative so that the mobilized driving connections of the third speed ratio will assume the drive of said driven member from said driving member.

6. In a change speed transmission, the combination of a drive member, a driven member, automatically variable change speed transmission mechanism for progressively changing the gear ratio between the drive and driven members from low first to second to direct drive fourth and for concurrently establishing, but normally overruled, third gear ratio in mobilized driving connections between the drive and driven members with the change from the second to the fourth gear ratios including automatic speed responsive clutch mechanism individual to the fourth and automatic speed responsive clutch mechanism individual to the third gear ratios both operable upon a single temporary reduction in speed of the drive member relative to the driven member whether the drive member is at a low or higher speed and including an overrunning brake in series in the mobilized third gear ratio driving connections permitting overrun therein so that the fourth speed ratio may normally drivingly prevail between the drive and driven members, and means employable at the will of the operator for abnormally releasing the direct drive connections temporarily under conditions of accompanying increase in speed of the drive member relative to the driven member for subsequently obtaining a reduction in speed of the engaged direct drive automatic speed responsive clutch only under the influence of the mobilized third gear ratio coming into play so that when said temporarily employed means is relinquished the transmission normally will be in third gear.

7. In a change speed transmission device, the combination of a drive member, a driven member, change speed transmission mechanism between said members including a plurality of epicyclic gear units in tandem, automatic means for establishing a direct drive between the drive and driven members including a plurality of automatic clutch mechanisms to establish the elements of the plurality of epicyclic gear units to rotate as a unit to render said direct drive but such that the elements of certain of the plurality are only influenced to rotate as a unit incident to the establishment of the direct drive while the elements of other of the plurality are individually locked with respect to distinct epicyclic gear units by respective of the automatic clutch mechanisms, all whereby a subsequent opening in the driving connections, such as would leave said individually locked units still locked, will free the elements of said certain of the units to gear function to render a comparatively high speed gear ratio between the drive and driven members as an alternative gear drive to said direct drive therebetween only slightly lower in ratio than said direct drive, and means for establishing an opening in the driving connections that are incidental to the established direct drive between the drive and driven members as aforesaid to free only the elements of the said certain of the epicyclic gear mechanism to gear function while the remainder of the plurality of epicyclic gear units are sustained locked to rotate as a unit.

8. In a change speed transmission mechanism, the combination of an engine drive shaft, a transmission driven shaft adapted for two-way drive coupling to the load, a final epicyclic gear mechanism having a driven element in two-way drive connection with said driven shaft and a drive element and an element adapted to manifest retrograde rotative tendencies under the influence of forward rotative efforts being applied to said drive element, means for transmitting rotative efforts from said engine drive shaft to said drive element of said final epicyclic gear mechanism including a primary epicyclic gear mechanism in operative connection with said drive element of said final gear train and having a plurality of elements adapted to be progressively connectable to be respectively individually driven from said engine drive shaft, means for restraining said retrograde tending element of the epicyclic gear mechanism from exercising such tendencies to some extent whereby said gear mechanism will be rendered gear functional to drive said driven transmission shaft, and means including successively operable speed responsively controlled clutch mechanisms for firstly connecting only certain of said plurality of elements of said primary gear mechanism to be driven directly and individually from said engine drive shaft and after an interim of increasing speed phase for cumulatively connecting other of said plurality of elements of said primary gear mechanism to be driven directly and individually from said engine drive shaft such that the accumulated individual connections between said engine drive shaft and said primary gear mechanism will lock the elements of the latter together and leave the elements of said final epicyclic gear mechanism gear functional to drive said driven transmission shaft.

9. In a power transmitting mechanism, a driving member having a rearwardly extending annulus portion, a driven shaft in axial alignment with, and extending into close proximity to the axis portion of said driving member, a plurality of epicyclic gear trains in tandem surrounding a forwardly intermediate portion of said driven shaft and for driving the latter and arranged within the space of said annulus elements of said plurality of gear trains adapted to manifest retrograde rotative tendencies under the influence of forward rotative efforts being applied to the respective gear trains, means including a tubular shaft encompassing an intermediate portion of said driven shaft for restraining said retrograde tending elements from exercising said manifestations to some extent whereby the epicyclic gear trains will be rendered gear functional to transmit said forward rotative efforts to said driven shaft, and means operable to connect and disconnect a gear member of the furthermost one of said tandem plurality of epicyclic gear trains, with respect to the axis portion of said driving member, to be driven from said driving member including a clutch element associated with the driving member but more closely related to a rearward portion of said annulus thereof.

10. In a change speed transmission, the combination of a driving member, an axially aligned driven shaft, a tubular shaft encompassing the driven shaft, change speed transmission mechanism between and operatively associated with the driving and driven members and including a plurality of epicyclic gear trains in tandem and in concentric operating adjacency with the tubular shaft, each of said trains including an element adapted to manifest retrograde rotative tendencies under the influence of forward rotative efforts being applied to the respective gear train and each including a drive element through the medium of which said forward rotative efforts may be applied to the respective gear train, master one-way stop means cooperating with the tubular shaft to restrain same in some degree from exercising retrograde rotative tendencies, individual one-way stop means cooperating with the retrograde tending element of certain only of the plurality of epicyclic gear trains and associated with the tubular shaft whereby the elements of said certain of the epicyclic gear trains are facilitated to be locked together while said tubular shaft remains cooperating with said master one-way stop means under retrograde influence from other of the plurality of epicyclic gear trains, and the retrograde tending element of other of the plurality of epicyclic gear trains being in non-relatively rotatable connection with the tubular shaft so as to bring about singular gear function of said other of the gear trains following locking of the elements of said certain of the plurality of gear trains.

11. In a change speed transmission, the combination of a driving member, an axially aligned driven shaft, a forwardly disposed epicyclic variable speed gear mechanism encircling the forward intermediate portion of said driven shaft and adapted to receive rotative efforts from the driving member and impart same to the forward end of the driven shaft, individual clutch mechanism for completing driving connections for said forwardly disposed gear mechanism between the driving member and forward end of the driven shaft, and means including a rearwardly disposed gear mechanism selectively employable either to take the reaction of the forwardly disposed gear mechanism or to give an independent forward speed gear drive between the driving member and the driven shaft that by-passes the forwardly disposed gear mechanism.

12. In a transmission mechanism, the combination of a driving member, an epicyclic gear train including a sun pinion gear, and planet pinions, meshing with said sun pinion and an annulus gear meshing with said planet gears and a rotatably mounted member carrying said planet pinions rotatably mounted thereon, an individual friction clutch element rotatable with said sun pinion and an individual friction clutch element rotatable with said annulus gear, clutch means adapted when engaged to connect one of said clutch elements to said driving member, other clutch means adapted when engaged to connect the other of said clutch elements to said driving member, resilient means for normally engaging one of said clutch means, resilient means for normally disengaging the other of said clutch means, means operable in response to a sufficient speed of rotation of one of the driving member and elements of said gear train for engaging the normally disengaged clutch means, and means operable at the will of an operator for disengaging the normally engaged clutch means.

13. In a transmission mechanism, the combination of a driving member, a driven member, change speed transmission mechanism between said members including variable speed gearing having two transmitting trains adapted to be connected to to be driven from the driving member, an individual friction clutch element rotatable with a member of one and an individual friction clutch element rotatable with a member of the other of said two trains, an intermediate driving clutch plate between the individual clutch elements and rotatable with the driving member, said intermediate plate being adapted to serve as a bottom pressure plate for either of the individual clutch elements, two presser plates rotatable with the driving member and disposed one adjacent one and the other adjacent the other of the individual clutch elements, said presser plates being disposed upon the opposite sides of the individual clutch elements with respect to the intermediate driving plate, resilient means normally displacing one of the two presser plates to clutch pack the adjacent individual clutch element against the intermediate driving clutch plate, means for unpacking said clutch at the will of the operator, resilient means adapted normally to hold the other presser plate out of clutch packing relation with its adjacent individual clutch element, and means responsive to the speed of the driving member for overcoming the last-named resilient means and for displacing said other presser plate to clutch pack its adjacent individual clutch element against the intermediate driving plate.

14. In a transmission mechanism, the combination of a driving member, an axially aligned driven shaft, a pair of concentric tubular shafts encompassing an intermediate portion of the driven shaft, a planetary gear mechanism operatively associated with and positioned between the driving member and the forward end of the driven shaft, the tubular shaft that is radially contiguous to the driven shaft being adapted to take the reaction of, or drive input to, said planetary gear mechanism, clutch mechanism for coupling the outer one of the two tubular shafts to the driving member so that it rotates therewith, a gear train establishable connecting the outer of said two tubular shafts to said driven shafts in the vicinity of their rearward ends to provide a forward speed reduction drive, and means including at least a portion of said gear train for partially opposing any retrograde rotative tendencies of the tubular shaft that takes the reaction of said planetary gear mechanism.

15. In a change speed transmission, the combination of a driving member, a driven member, an automatically variable change speed transmission mechanism for progressively changing the gear ratio between the driving and driven members from slow speed drive to certain faster speed drives and transmitting means including gearing not controlled by said automatically variable change speed transmission and including a cooperating normally engaged but optionally disengageable system of frictionally-engageable elements, selectively shiftable devices forming means establishable at the option of the operator to establish a fixed forward gear ratio of driving connections between the driving and driven members completely circumventing said automatically variable change speed transmission mechanism while incidentally rendering the automatically variable transmission mechanism in neutral between the driving and driven members and said optionally disengageable system of frictionally-engageable elements being adapted to contribute to the establishment of a secondary input power flow from said driving member to said automatically variable change speed transmission mechanism when engaged and being adapted to disconnect said secondary input power flow when disengaged.

16. In a change speed transmission, the combination of a driving member, a driven member, change speed transmission mechanism between the driving and driven members including a plurality of planetary gear units compounded in series, a first friction clutch element rotatable with an element of one of the plurality of gear units and engageable with one of the driving and driven members, a second friction clutch element rotatable with another element of one of the plurality of gear units and engageable with the same said one of the driving and driven members, means including resilient devices normally energizing engagement of one of said friction clutch elements and means whereby the operator may cause disengagement of said one clutch element at will, means automatically operable in response to variations in the speed of the same said one member to engage the other friction clutch element, and means including automatic speed responsive clutch mechanism operable upon a temporary reduction in speed of the driving member relative to the driven member adapted to connect another element of the plurality of planetary gear units to rotate with the same said one member through the cooperating medium of the normally engaged friction clutch element such that said connection is adapted to be opened at the will of the operator by disengaging said normally engaged clutch element.

17. In a transmission mechanism, the combination of a driving member, a driven shaft in axial alignment with the driving member, a tubular intermediate member encircling an intermediate portion of the driven shaft, a friction clutch element engageable with the driving member and connected to direct drive the intermediate member, means including resilient means normally engaging said clutch element, means adapted to enable the operator to cause disengagement of said clutch element at will, a gear mechanism operative between the intermediate member and the driven shaft and provided with interengageable parts and shiftable means whereby said gear mechanism may be selectively established either as no drive between the intermediate member and driven shaft, or as reversing gear drive between the intermediate member and driven shaft, or as forward gear drive between the intermediate member and driven shaft all by means of connections between the rearward portion of the intermediate member and the driven shaft, and means operable to establish driving connections between the driving and driven members relatively ahead of and other than through the medium of said intermediate member and said shiftable gear mechanism and including clutch means in series with other elements in said means to complete the driving connections of said means to the driving and driven members independently of said shiftable gear mechanism.

18. In a change speed transmission mechanism, a drive member; a coaxial driven member; three epicyclic gear trains in tandem to drive said driven member from said driving member each constituted of an input ring gear, a sun pinion reactance gear, and individual planet gearing connecting the ring and sun gear members of a respective epicyclic gear train and adapted as a carried mass to drive the ring gear of the next epicyclic gear train; means operable to establish either, all three of said epicyclic gear trains simultaneously gear drive operative for low speed gear ratio, or only the second and third of the three with respect to driven positions in their tandem driving arrangement from said drive member simultaneously gear drive operative for second speed gear ratio, or only one of the second and third of the three with respect to driven positions in their tandem driving arrangement from said drive member for gear drive operation for third gear ratio; and means operable to establish direct drive between said drive and driven members including a system of frictionally engageable elements, the last said elements being adapted to be optionally disengaged so as to cause one of the lower speed ratios to assume the drive between said drive and driven members in the place of the direct drive connection.

19. In a power transmission, in combination with a drive member and a coaxial driven shaft, said drive member having an annulus driving portion extending in encompassing relation over the contiguous end portion of said driven shaft, and a plurality of epicyclic gear trains in tandem the rearmost positioned of said trains for taking the rotative efforts from the rearmost end of the annulus portion of said drive member and the successively relatively forwardly positioned of said trains therefrom giving relatively return parallel power flow driving continuity from the output of said rearmost positioned of said trains until drivingly reaching said driven shaft through the forwardmost positioned of said trains such that the single power flow in rotating said driven member from said drive member attains three parallels first through said drive member rearwardly over said plurality of epicyclic trains and input to the rearmost one of said plurality, thence forwardly progressively through said plurality with delivery at substantially the forward end of said driven shaft, and thence through the latter axially independently of and to rearwardly beyond the entire plurality of said epicyclic trains, all whereby a plurality of epicyclic gear trains each comprising a ring gear and a sun pinion reactance gear and connecting planet gears may simultaneously give progressively torque multiplying steps of continuous power flow transmission such that all said plurality of epicyclic trains are enabled to receive reactance to their respective sun pinion reactance members through a common singular reactance train from a position rearwardly beyond the ensemble plurality of tandem epicyclic trains extending forwardly to serve first one and then another of the tandem plurality of epicyclic trains, and such that the carrier for the planet gears of each of the tandem plurality of epicyclic trains may, with enlarged diameter, directly drive the ring gear member of the next drivingly adjacent epicyclic train rather than from the respective planet carrier of one train with contracted diameter drivingly reach the ring gear member of the drivingly next epicyclic train through the bore of the sun pinion reactance gear member and thence with enlarged diameter drive the ring gear of said next epicyclic train, as would be necessitated in an arrangement of a plurality of such epicyclic trains in tandem for progressively driving each next epicyclic train from the front to the rear.

20. In a motor vehicle change speed transmission, the combination of a driving member; a driven member; automatically variable change speed transmission mechanism for normally progressively changing the gear ratio between said driving and driven members from low speed to second speed to fourth speed and for automatically completing mobilization of driving connections between said driving and driven members for third speed substantially simultaneously with the establishment of fourth speed including a system of normally spring engaged elements for contributing to fourth speed establishment when engaged and being adapted when disengaged to drivingly disable the fourth speed ratio without immobilizing its driving connections so that when simultaneously the vehicle engine throttle is held open, the driving connections of said automatically mobilized third speed will automatically assume the driving function under the stepped up engine speed, and means employable at will and operable solely at the option of the operator adapted to force disengagement of said system of elements against the counter influence of its engaging springs.

21. In a motor vehicle change speed transmission, the combination as in claim 20 and including means automatically operable to disestablish fourth speed during a momentary dwell of its disablement brought about by the forced disengagement of said system of elements in accompanyment with the vehicle engine throttle being simultaneously held open whereby the driving connections of fourth speed will become immobilized between said driving and driven members to the extent that the forcing influence for accomplishing disengagement of said system of elements and in turn for causing said disablement of fourth speed ratio may be withdrawn and third speed ratio be maintained drivingly established between said driving and driven members at any degree of engine throttle which will preclude temporary reduction in the speed of the driving member relative to the driven member, and means automatically operable to reestablish fourth speed ratio between said driving and driven members supplantively over third speed ratio therebetween upon a temporary reduction in the speed of said driving member relative to said driven member.

22. In a motor vehicle change speed transmission, the combination of a drive member adapted to rotate with the vehicle engine crankshaft; a driven member; an automatically but yieldingly engaging friction clutch mechanism adapted for manual disengagement at will; and automatically variable change speed transmission mechanism for normally changing the driving speed ratio between said drive and driven members at least from a certain speed to a relatively faster speed and for substantially simultaneously automatically establishing mobilized driving connections between said drive and driven members that will immediately operate to rotate said driven member from said drive member at an intermediate speed ratio, with respect to said certain and said relatively faster speed ratios, in the event of and solely upon said clutch mechanism being at least momentarily disengaged and said drive member being accelerated sufficiently in speed, said transmission mechanism including means such that said mobilized intermediate speed ratio driving connections are automatically disabled from manifesting any conflicting speed ratio influence over an established relatively faster speed ratio and further including means such that said relatively faster speed ratio will automatically establish itself between said drive and driven members under certain conditions arising subsequently to return of said clutch to engaged condition.

23. In a change speed transmission, the combination of a drive member, a driven member, automatically variable change speed transmission mechanism for changing the forward drive gear ratios between said drive and driven members including planetary gearing having a reactance member adapted to be established in operable connection with a sationary member whereby it will be facilitated to establish at least one-way reactance, a stationary member, and means for selectively establishing said reactance member in said operable connection with said stationary member including a second planetary gearset through a certain embodiment of which said reactance connection is adapted to extend, said second planetary gearset forming means non-operative with respect to contributing power flow driving connections to said automatically variable change speed transmission mechanism between said drive and driven members, and said second planetary gearset further forming means alternatively adapted to be established either so as to give two-way reversing driving connections between said drive and driven members while said automatically variable change speed transmission mechanism is concurrently established in neutral, or so as to give two-way forward gear drive connections between said drive and driven members while said automatically variable change speed transmission mechanism is concurrently established in neutral.

24. In a change speed transmission mechanism, the combination of a drive member; a driven member; automatically variable change speed transmission mechanism for progressively changing the gear ratio between said drive and driven members at least from a certain speed to a relatively faster speed such that the change will leave said lower speed ratio driving connections mobilized between said drive and driven members said transmission mechanism including a device for automatically establishing said faster speed ratio automatically operable when certain conditions are attained in the mechanism; other transmission mechanism adapted to be selectively employable either to establish a fixed speed altering forward gear drive or to give a fixed reversing gear drive, either of said drives two-way drive connecting said drive and driven members by connections by-passing said automatically variable change speed transmission mechanism; and a normally spring engaged friction clutch adapted for disengagement at the will of the operator in association with both said faster speed ratio establishing device and with said other transmission mechanism, with said faster speed ratio automatic establishing device said clutch being adapted for disabling said faster speed ratio of the automatic change speed range of said automatically variable change speed mechanism in a manner such that the mobilized driving connections of a lower speed ratio may automatically assume the drive of said driven member from said drive member, and with said other transmission mechanism, said clutch being adapted for completing driving connections through same to give said fixed forward or fixed reversing gear drives between said drive and driven members independently of said automatically variable change speed transmission mechanism.

25. In a change speed transmission mechanism, the combination of a drive member; a driven member; means including a plurality of epicyclic gear trains in series forming an automatically variable forward change speed transmission mechanism for changing the forward gear ratios between said drive and driven members; means including another epicyclic gear train, the latter train having no adaptation for contributing power transmission between said drive and driven members through the different speed functions of said automatically variable change speed transmission mechanism, the latter train forming alternative transmission mechanism between said drive and driven members for manual shift selection for giving at least either to give a fixed forward or a fixed reverse gear drive between said members while establishing said automatically variable transmission mechanism in neutral, and a spring engaged friction clutch adapted for manual disengagement for completing the driving connections of said shift selective forward and reverse permanent gears.

26. In an automatic variable speed transmission, the combination of a driven planetary gear unit including an internal gear member; a normally disengaged friction clutch whose driven clutch element is rotatable with said internal gear; means for automatically actuating said clutch into engaged condition when certain conditions are attained in the mechanism; a driving member; a driving planetary gear unit; second clutch means operable upon sufficient speed of driving rotation being imparted thereto and adapted to complete driving connections between said driving member and a gear member of said driven gear unit through said driving planetary gear unit in driving circumvention of said clutch unit, the first said friction clutch being connected to complete driving connections from said driving member to the internal gear of said driven planetary gear unit so as to drivingly short-circuit said second clutch means.

27. In a change speed power transmitting mechanism, in combination with a driving member and first and second drivingly positioned torque multiplying planetary gear units in series each including an internal gear and devices including a clutch device operable upon sufficient speed of driving rotation being imparted thereto for establishing the drive between said driving member and one gear member of said second gear unit drivingly through said first gear unit; of means for accumulatively automatically establishing a parallel power-flow supplementary power-transmitting coupling in the drive from said driving member to said second gear unit so as to give an individual driving connection primarily to the internal gear member of said second gear unit, said means including a friction second clutch in parallel series with and adapted to accumulatively drivingly short-circuit said first clutch device, the driven clutch element of said friction second clutch being rotatable with the internal gear of said second gear unit, means for automatically normally holding said second clutch disengaged, and means operable when certain conditions are attained in the mechanism for automatically actuating said clutch into engaged condition.

28. An automatic variable speed transmission mechanism for progressively changing the gear ratio between two of its members from slow speed high rate torque multiplying gear drive to faster speed lower rate torque multiplying gear drive and subsequently to direct drive, said mechanism including an automatic coupling unit for completing the driving connections for said slow speed ratio, a subsequently operable automatic friction clutch unit for establishing said faster speed ratio gear drive, additional subsequently operable automatic clutch mechanism for establishing direct drive, said mechanism including the functioning of all the named coupling and clutch mechanisms in establishing direct drive so that each of said coupling and clutch mechanisms is in parallel with other power transmitting connections so that any one of said coupling and clutch mechanisms is apportioned only a division of the torque at least during direct drive.

29. In a power transmission, the combination: of a driving member; a driven member; automatically variable change speed transmission mechanism for normally progressively changing the gear ratio between said driving and driven members from low speed to second speed to direct drive fourth speed including automatic speed responsive clutch mechanism for establishing fourth speed ratio successively to the establishment of second speed ratio and operable upon a temporary reduction in the speed of the driving member relative to the driven member, automatic means adapted to establish mobilized driving connections for a third speed ratio incidental to the establishment of the fourth speed ratio successively to the establishment of second speed ratio, means operable solely at the will of the operator adapted to open the driving connections for the direct drive fourth speed ratio under constant torque driving conditions sufficiently to enable said mobilized third speed ratio connections to assume the drive between said driving and driven members, and means to cause the speed of the engaged automatic speed responsive clutch mechanism to be reduced upon opening of said driving connections thereby to secure automatic return of said responsive clutch to disengaged condition to establish the third speed ratio upon relinquishment of said operator controlled connection opening means, and said direct drive fourth speed ratio being reestablishable over said third speed upon a subsequent temporary reduction in the speed of the driving member relative to the driven member.

30. In a power transmission, the combination: of a drive shaft; a driven shaft; automatically variable change speed transmission mechanism for normally progressively changing the gear ratio between said drive and driven shafts from low speed to second speed to fourth speed including a clutch device operable upon sufficient speed of driving rotation being imparted thereto to complete the driving connections for the low gear ratio with slipping-power-transmitting clutch characteristics, said mechanism being adapted to include said low speed ratio completing clutch device normally clutch operating through all subsequently established speed ratios of drive, an automatic friction clutch for establishing second speed ratio under constant torque conditions, said second speed clutch being arranged in parallel with said low ratio completing clutch device, automatic speed responsive clutch mechanisms for establishing fourth speed ratio successively to establishment of second speed and operable upon a temporary reduction in the speed of the drive shaft relative to the driven shaft, means including a system of frictionally-engageable elements adapted to contribute to the fourth speed ratio establishment when engaged, said frictionally-engageable elements adapted to be disengaged at the will of the operator, and means responsive to said frictionally-engageable elements being momentarily disengaged while said driving member is simultaneously sustained under sufficient power, to establish third speed ratio of drive between said drive and driven shafts almost instantly so as to permit reengagement of said frictionally-engageable elements without reestablishment of the fourth speed ratio, said mechanism forming means enabling subsequent reestablishment of the fourth speed ratio supplantively over the third speed ratio and operable upon a subsequent temporary reduction in the speed of the drive shaft relative to the driven shaft.

31. In a power transmission, the combination: of a drive shaft; a driven shaft; automatically variable change speed transmission mechanism operable to progressively change the gear ratio between said drive and driven shafts from low speed to second speed to third speed to fourth speed including clutch means to establish the second speed successively to the low speed under torque, an automatic speed responsive clutch mechanism for conditionally establishing the third speed to succeed the second speed and operable upon a temporary reduction in the speed of the drive shaft relative to the driven shaft; a second automatic speed responsive clutch mechanism adapted to establish the fourth speed operable upon a temporary reduction in the speed of the drive shaft relative to the driven shaft, and means under control of the operator adapted to be temporarily actuated out of an automatic normal condition and into an abnormal condition so as to condition the transmission mechanism for establishment of third speed to succeed the second speed or to disestablish fourth speed, and means to cause mobilization of the third speed driving connections simultaneously with the establishment of the fourth speed so that abnormal disestablishment of the fourth speed will permit third speed to become immediately operable to assume the drive between said drive and driven shafts.

32. In a change speed power transmission mechanism, the combination: of a drive shaft; a driven shaft; variable ratio transmission mechanism drive operatively between said shafts including intermediary power transmission members including a speed and torque changing gear train, and means for completing the driving connections between said shafts drivingly through said intermediary members including said gear train, said means including a planetary gear unit having a sun gear element an internal gear element and a planet carrier having a planet pinion meshed with each said sun and internal gears, a friction clutch provided with means for automatically engaging same and provided with means to enable said clutch to be disengaged at will by an operator, said clutch being adapted to couple one of said sun and internal gears directly to one of said drive and driven shaft and intermediary members, and a second clutch means automatically operable in response to variations in the speed of certain of said drive and driven shaft and intermediary members, said second clutch means being adapted to couple the other of said sun and internal gears directly to said one of said drive and driven shaft and intermediary members.

33. In a power transmission, the combination: of a driven shaft; a plurality of epicyclic gear trains compounded in series and positioned with their assemblies surrounding an intermediate portion of said driven shaft and with only the forward end one of said plurality being connected to drive said driven shaft; a driving member coaxial with said driven shaft and including a hollow flywheel portion surrounding the forwardmost of said epicyclic gearing assembly; clutch means associated with the flywheel portion of said driving member and automatically operable in response to low speed phase variations in the speed of rotation thereof and clutch means being adapted for establishing the drive between said driving member and primarily the rearmost one of said plurality of epicyclic gear trains so as initially to establish the drive through the entirety of said plurality from the rear so as to drive said driven shaft at its forward end; and a subsequently operating clutch means associated with said flywheel portion of said driving member and being automatically operable in response to faster speed phase variations in the speed of rotation thereof and for establishing the drive between said driving member in a short-circuiting manner to an intermediate one of said plurality of epicyclic gear trains.

34. In a change speed power transmission, the combination: of a drive shaft; a driven shaft; automatically variable change speed transmission mechanism for coupling said shafts; and a shiftable selective gearing cooperating with said automatically variable change speed transmission mechanism such that when it is in one selected position said gearing establishes said automatically variable transmission mechanism drive operable between said shafts, while in any other position said selective gearing to establish said automatically variable transmission mechanism in neutral, said selective gearing forming means when selected in a second position for establishing a fixed ratio two-way underdrive forward speed gear connecting said shafts independently of and drivingly short-circuiting said automatically variable transmission mechanism, and said gearing when selected in a third position forming means for establishing a fixed ratio of two-way reversing gear drive connecting said shafts independently of and drivingly short-circuiting said automatically variable change speed transmission mechanism.

35. In a power transmission, the combination: of a driving member; a driven member; variable ratio change speed transmission mechanism drive operatively associated between said driving and driven members including differential planetary gearing, clutch means cooperating with one element of said gearing to establish the low speed gear ratio, said clutch means being clutch operable in response to a low speed phase of rotation in said mechanism, subsequently and accumulative operating clutch means cooperating with a second element of said gearing and to establish a faster speed ratio, said clutch means being speed responsively controlled clutch operable in response to a faster speed phase of rotation in the mechanism, and a normally yieldingly engaged third clutch means cooperating with a third element of said gearing such that a circuit of power transmitting coupling connections are drivingly closable by other of the aforementioned clutch means coming into simultaneous clutching function with said third clutch, manually actuatable means for disengaging said third clutch, said third clutch forming mechanism operable to yield a lower speed ratio of drive between said driving and driven members when disengaged after the establishment of said faster speed ratio.

36. In an automatic variable ratio change speed transmission mechanism, in combination, first and second drivingly positioned planetary gear units compounded in series, said second unit including an internal gear element; clutch means to complete the driving connections of a first train of power-transmitting coupling means with slipping-power-transmitting-clutching characteristics input to power to said second gear unit through the medium of gear function in said first gear unit, said first clutch being operable upon sufficient speed of rotation thereof; a normally disengaged friction second clutch in parallel with and adapted to take its drive immediately from the same driving member as said first clutch means, the driven clutch element of said second clutch being carried rotatable with the internal gear of said second gear unit, said second clutch being adapted when engaged to establish a parallel train of input power connections to said second gear unit to increase the output speed of the latter; means for automatically engaging said second clutch the last said means being operable when certain conditions are attained in the mechanism, the simultaneous functions and the parallel arrangement of said first and second clutch means being adapted to establish the elements of one of said first and second planetary gear units a wholly revolving unit under the simultaneous parallel multi-power flow input coming to the respective gear unit through said first and said second clutch means; and automatic alternately operable brake and third clutch devices, the latter devices being adapted respectively to establish reactance to provide gear function in the other of said first and second gear units, and alternately to cause its elements to rotate as a unit.

37. In a power transmission including a drive shaft and a driven shaft, automatic variable change speed transmission mechanism for coupling said drive shaft to drive said driven shaft in either of different driving speed sub-ratios or in direct drive, including a plurality of internal gear type planetary gear units compounded in series, means including clutch means operable upon sufficient speed of rotation thereof to establish the low speed ratio with slipping-power-transmitting coupling performance, a normally disengaged but subsequently automatic engageable friction second clutch whose driven clutch element rotatable with the internal gear of a planetary gear unit that is in driving relation to another of said compounded plurality, said second clutch being arranged so that when engaged it establishes a short-circuiting power-transmitting coupling in the drive that drivingly circumvents the position of and drives accumulatively with said first clutch means so as to establish a faster speed sub-ratio successively over a slower speed sub-ratio, and third clutch mechanism automatically operable to establish the direct drive ratio when said first and second clutch means are concurrently engaged by causing the entire assembly of said plurality of compounded planetary gear units to become rotatable substantially as a unit, said first and second clutch means being arranged in parallel so that when simultaneously serving a respective driving ratio, including direct drive, each handles only a split apportionment of the torque.

38. In a power transmission, in combination: a drive shaft; a transmission shaft adapted to be driven therefrom and coaxial therewith and in substantially end to end relation thereto; a planetary gear unit whose assembly includes an internal driving gear element and a sun reaction gear element, an output planet carrier having planet pinion meshed with each said sun and internal gears, said gear unit being disposed independently encircling an intermediate portion of said transmission shaft; a hollow flywheel rotatable with said drive shaft and provided with continuing hollow connecting means adapted to drive the internal gear element of said planetary gear unit and means comprising an intermediate transmitting train reposing concentrically with the hollow train of drive connections and between said drive shaft and said internal gear of said planetary gear unit, and said transmission shaft, forming means connecting said output planet carrier of said planetary gear unit to drive said transmission shaft through a driving juncture with the latter at substantially its forward end, all such that progression of the power flow is rearward from said drive shaft first through the hollow train of drive connections and therefrom to said internal gear of said planetary gear unit, and thence in return parallel power flow forwardly from said planetary gear unit through said concentrically intermediate train to the driving juncture at said substantially forward end of said transmission shaft; and automatic alternately operating brake and clutch devices operable respectively to hold said sun reaction gear element and alternately to establish the elements of said planetary gear unit to rotate as a unit.

39. In a motor vehicle drive, in combination with the vehicle engine crank shaft; a transmission shaft in axial alignment and extending into substantially end to end relation with the crank shaft; a planetary gear unit having an internal driving gear element and a sun reaction gear element and an output planet carrier whose planet pinion element meshes with said sun and internal gears; means including a hollow flywheel rotatable with the crank shaft forming a continuing connection from said flywheel to drive primarily the internal gear element of said gear unit directly, and means, including a forwardly extending hollow continuation of the output planet carrier of said gear unit and an operating power-transmitting coupling device between the forward end of said continuation of the output planet carrier and substantially the forward end of said transmission shaft, for giving a parallel concentric intermediate transmitting train between the connection of the crank shaft to said internal gear and said transmission shaft, and adapted for power flow forwardly from said gear unit to substantially the forward end of said transmission shaft, whereby the power flow from the crank shaft to the contiguous forward end of said transmission shaft is progressively rearwardly to said gear unit via its internal gear element and thence as output of said gear unit, forwardly to the forward end of said transmission shaft through said operating power-transmitting coupling device.

40. The combination, in a power transmission, of a driving planetary gear unit having an output planet carrier; with a driven planetary gear unit having an internal gear element adapted to be individually and directly driven from the output planet carrier of said driving planetary gear unit, a sun gear element mounted so as to be normally free to rotate relative to the output planet carrier of said driving planetary gear unit, and an individual output planet carrier whose planet pinion meshes with each said sun and internal gears of said driven planetary gear unit; and clutch means adapted for directly connecting the output planet carrier of said driving planetary gear unit with the sun gear of said driven planetary gear unit.

41. In a power transmission, the combination of a drive shaft, a driven shaft, transmission means for driving said driven shaft from said drive shaft including a pair of driving and driven planetary gear units compounded in series, the driving gear unit having an internal input gear element and a sun reaction gear element and an individual output planet carrier whose planet pinion meshes with each said sun and internal gears, the drive shaft being provided with continuing connecting means adapted to drive primarily and directly said internal gear of said driving gear unit, said driven gear unit having a sun pinion gear element and an internal gear element and an individual output planet carrier adapted for directly driving said driven shaft and whose planet pinion meshes with each said sun and internal gears of said driven gear unit, the sun pinion of said driven gear unit being normally rotatable independently of the output planet carrier of said driving gear unit, normally drive ineffective input clutch means to input power to the sun pinion of said driven gear unit when effective, the output planet carrier of said driving gear unit being provided with a continuing connection for directly driving said clutch means and adapted to drive the internal gear of said driven gear unit directly and independently of, and in parallel short-circuiting relation to said clutch means, said clutch means being automatically actuable under certain conditions of transmission speed.

42. In a power transmission, the combination of a drive shaft, a pair of driving and driven planetary gear units each having a sun gear element and an internal gear element and an individual output planet carrier whose planet pinion meshes with each said sun and internal gears of the respective planetary gear unit, means directly drive connecting said drive shaft and primarily the internal gear of said driving planetary gear unit, automatic alternately operating brake and clutch means cooperating with the sun gear of said driving planetary gear unit, said brake and clutch means adapted respectively to hold said sun gear and alternately to establish said sun gear connected to rotate as a unit with the other elements of said driving planetary gear unit, the sun gear element of said driven planetary gear unit being normally rotatable independently of any element of said driving planetary gear unit including the latter's output planet carrier, clutch means whose driving and driven elements respectively cooperate with the output planet carrier of said driving planetary gear unit and the sun gear of said driven planetary gear unit, the internal gear of said driven planetary gear unit being connected to be independently and directly driven from the output planet carrier of said driving planetary gear unit, and the last said drive being in circumvention of the clutch means cooperating with the sun gear.

43. In a power transmission, a drive shaft, a driven shaft, a pair of adjacent driving and driven planetary gear units each comprising a sun gear element and an internal gear element and an individual output planet carrier whose planet pinion meshes with each said sun and internal gears of the respective planetary gear unit, the planet carrier of said driven planetary gear unit being rotatable with said driven shaft, the sun of said driven gear unit being normally floating relative to any element of the driving planetary gear unit including the latter's output planet carrier and said drive and driven shafts, clutch means connected to be driven from said drive shaft drivingly through said driving planetary gear unit, the driven element of said clutch means being rotatable with solely the sun gear of said driven planetary gear unit, the driving element of said clutch means being rotatable with the output planet carrier of said driving planetary gear unit, and the drive shaft being provided with a continuing connection to drive the internal gear of said driving planetary gear unit directly, so that the drive is progressively through said driving and driven planetary gear units and thence to the driven shaft.

44. In a motor vehicle drive, in combination with the vehicle engine crank shaft; of an axially aligned transmission shaft supported at its forward end by the crank shaft so as to be rotatable independently thereof, a planetary gear unit arranged independently of and encircling said transmission shaft at a longitudinally intermediate point of the latter, said gear unit having a primary driving internal gear element, means operatively coupled to the planet carrier of said gear unit so that output power flow therefrom is delivered forwardly to said transmission shaft at a point on the latter adjacent its said forward support, and hollow means connected to the crank shaft, and adapted to drive primarily said internal gear element of said gear unit in circumvention of said coupled means.

45. In a power transmission, in combination, driving, driven and intermediate shafts connected in series with a plurality of internal gear type planetary gear units the latter operatively interconnecting said shafts, a parallel related pair of first and second clutch means an element of each of which cooperate with one each of said shafts, another element of said first of said parallel pair clutch means cooperating with the sun pinion element of one of said planetary gear units, another element of said second of said pair of parallel clutch means cooperating with the internal gear element of the same said one of said planetary gear units, a third clutch means having an element cooperating with the same shaft with which said first and second clutch means cooperate, and another element of said third clutch means cooperate with one of the sun and internal gear elements of another of said planetary gear units.

46. In a power transmitting mechanism, in combination, a plurality of planetary gear units compounded drivingly in series, a pair of concentric shafts extending axially through the position and assembly of a driving one of said compounded plurality of planetary gear units so that either of said shafts is normally free to rotate relative to each other and relative to any gear element of said driving planetary gear unit, and means including planetary gearing in said compounded plurality that is in driven relation to said driving planetary gear unit adapted to drivingly connect said pair of concentric shafts to each other and to be driven by the drive that comes through said driving planetary gear unit.

47. In a power transmission, the combination: of a drive shaft; a driven shaft; automatic variable change speed transmission mechanism adapted to progressively change the gear ratio between said drive and driven shafts from a slow speed ratio to a faster speed ratio of underdrive gear and to culminate its progression by automatically establishing a direct drive, including a plurality of internal gear type planetary gear units connected in series including a sub-plurality of said units that are compounded in series for torque multiplication for providing the forward speeds, the gear train of the rearmost of the full plurality of said planetary gear units being adapted to idle when the transmission is arranged for automatic change speed forward drive operation, means movably under control of the operator to selectively establish the transmission for automatic change speed forward drive operation, or for reverse, the sun pinion gear element of said rearmost planetary gear unit being permanently mobilized to be rotated from said drive shaft whether the transmission is selected for automatic change speed forward drive, or for reverse, said operator controlled selective means being adapted to disconnect the internal gear element of said rearmost planetary gear unit from a second element to provide said idling operation of said rearmost gear unit, incidental to automatic change speed forward drive operation, means for establishing reactance to certain of the planetary gear units or alternately to disestablish said reactance and to establish reactance to said rearmost planetary gear unit to provide for gear function in the latter unit and to incidentally connect the latter's said internal gear element to a second element for giving reversing gear function between said drive and driven shafts and whereby the rearmost planetary gear unit gear functions to complete the driving connections for the reversing gear drive.

48. In a power transmission, the combination: of a drive shaft; a driven shaft; a planetary gear unit having a sun drive gear element and an internal second driving gear element and an individual output planet carrier whose planet pinion meshes with each said sun and internal gears; with parallel positioned first operating and subsequently accumulatively operating second clutch means whose driven clutch elements rotate respectively with said sun and internal gears; and means for automatically completing the driving connections between said drive and driven shafts, said means adapted to include the driving connections brought about through the simultaneous function of said parallel pair of clutch means for driving said planetary gear unit first in a speed-reducing torque-multiplying gear ratio and later in direct drive, so that in either a speed-reducing torque-multiplying gear drive, or in direct drive, input power and torque is divided between the parallel pair of clutch means in accordance with the relative pitch line velocities of the sun and internal gears of a respective planetary gear unit which gears drive the latter's output planet carrier.

49. In a motor vehicle drive, in combination, a driven shaft, a plurality of internal gear type planetary gear units compounded in tandem series, and adapted to drive said driven shaft, clutch means connected so that its output element directly rotates a driving gear element of a planetary gear unit of said compounded plurality that is positioned to be power driven from other planetary gearing in said compounded plurality, and a hollow engine flywheel circumventing said clutch means and adapted to provide a continuing connection to directly drive the internal driving gear element of the primary driving planetary gear unit of said compounded series.

50. In a change speed transmission, the combination of a drive member; a coaxial driven member; an epicyclic gear train having a primary driving internal gear element adapted to be rotated from and at the same speed as said drive member, a sun pinion element adapted to be operable in reactance gear function to contribute to the establishment of said gear train, and planet gears operatively connecting said internal and sun gears and adapted to rotate said driven member; means for establishing at least one-way reactance for said sun gear; and means for coupling said sun gear to rotate with said drive member including a normally spring engaged system of elements adapted for disengagement at will, and an automatic speed responsive clutch mechanism in tandem between said drive member and said sun gear adapted to give a direct drive coupling train of connections therebetween, said train being adapted for establishment by engagement of said automatic speed responsive clutch and for disestablishment at will by disengagement of said spring engaged elements.

EVERETT R. BURTNETT.